United States Patent [19]
Tynan et al.

[11] Patent Number: 5,941,634
[45] Date of Patent: Aug. 24, 1999

[54] POLYMER MIXING APPARATUS AND METHOD

[75] Inventors: Daniel Gregory Tynan, Wilmington, Del.; Constantine D. Papaspyrides, Athens, United Kingdom; Ioannis V. Bletsos, Vienna, W. Va.

[73] Assignee: E.I. du Pont de Nemours and Company, Wilmington, Del.

[21] Appl. No.: 09/023,243

[22] Filed: Feb. 13, 1998

Related U.S. Application Data

[62] Division of application No. 08/657,743, May 31, 1996, Pat. No. 5,727,876.

[51] Int. Cl.[6] .................................................. B29B 7/18
[52] U.S. Cl. .......................... 366/79; 366/100; 366/189; 366/266
[58] Field of Search .................................. 366/79, 85, 88, 366/100, 189, 144, 145, 266, 301, 76.1, 76.93, 77, 76.2; 425/69, 117

[56] References Cited

U.S. PATENT DOCUMENTS

| | | |
|---|---|---|
| 2,130,948 | 9/1938 | Carothers . |
| 2,163,636 | 8/1939 | Spanagel . |
| 2,172,374 | 11/1939 | Flory . |
| 3,132,739 | 5/1964 | Jakobsson et al. ............... 366/301 |
| 3,232,909 | 2/1966 | Werner . |
| 3,379,696 | 3/1964 | Wiloth . |
| 3,795,456 | 3/1974 | Schafer .............................. 366/79 |
| 3,945,620 | 3/1976 | Ruegg ................................ 366/79 |
| 3,953,006 | 4/1976 | Patarcity et al. ................. 366/100 |
| 4,103,354 | 7/1978 | Gorbatov et al. ................ 366/266 |
| 4,391,575 | 7/1983 | Osrow ................................ 425/190 |
| 4,527,899 | 7/1985 | Blach et al. ........................ 366/79 |
| 4,650,337 | 3/1987 | Otto .................................... 366/97 |
| 4,925,914 | 5/1990 | Dolden et al. ................... 528/336 |
| 4,941,132 | 7/1990 | Horn et al. ........................ 366/300 |
| 5,332,308 | 7/1994 | Scheuring ......................... 366/76 |
| 5,382,089 | 1/1995 | Mosher ............................... 366/85 |

FOREIGN PATENT DOCUMENTS

| | | |
|---|---|---|
| 0455066 | 4/1956 | Germany . |
| 32472 | 2/1988 | Japan . |
| 801733 | 12/1988 | Japan . |
| 1063109 | 3/1989 | Japan ............................... 366/100 |

OTHER PUBLICATIONS

Manas–Zloczower et al., Mixing and Compounding of Polymers, Theory and Practice I, Editors, Hanser/Gardner Publications, Cincinnati Ohio, 1994.

Mark's Standard Handbook for Mechanical Engineers, 8th Edition, T. Baumeister, McGraw–Hill Book Company, pp. 8-35 —8–38, 1978.

*Primary Examiner*—Tony G. Soohoo

[57] ABSTRACT

A mixing apparatus suitable for mixing and conveying solid, particulate, polymeric materials, comprising a barrel that can be heated and cooled, at least two co-rotatable, self-wiping extruder screws located within the bore of the barrel, the screws being connected through a laterally flexible coupling to a drive means which can reverse the direction of rotation of the screws upon the occurrence of a predetermined event. The apparatus also comprises a closeable feed port and a closeable discharge port, both of which can be made gas-tight, the shafts of the screws being provided with seals capable of withstanding elevated gas pressures inside the barrel.

2 Claims, 4 Drawing Sheets

POLYMER MIXING APPARATUS AND METHOD

This is a divisional of Ser. No. 08/657,743, filed on May 31, 1996, now U.S. Pat. No. 5,727,876.

FIELD OF THE INVENTION

This invention relates to a mixing apparatus equipped with a multiplicity of rotating meshed screws capable of reversing the direction of their rotation, which apparatus is suitable for mixing and conveying both granular solids and viscous liquids, such as molten polymers. The apparatus of this invention combines the advantages of a batch mixer with those of an extruder. The apparatus of the present invention is particularly well-suited to solid-phase polycondensation of monomers to polymers such as polyesters and polyamides of high molecular weight.

BACKGROUND OF THE INVENTION

Rotor-equipped mixing devices such as screw-type extruders and batch mixers are well known and are described in considerable detail in *Mixing and Compounding of Polymers, Theory and Practice,* I. Manas-Zloczower et al, editors; Hanser/Gardner Publications, Cincinatti, Ohio, 1994 and in *Extrusion of Plastics,* Second Edition, by E. G. Fisher; John Wiley and Sons, London, 1964. Included therein are guidelines for choosing among various extruder screw configurations, including co-rotating and counter-rotating, meshed and non-meshed, self-wiping and non-self-wiping screws. Rotors provided in batch mixers vary considerably in design from simple paddles to complex geometries.

Typically, screw-type extruders are employed to extrude a formable material through a flow-restrictive orifice to form an extrudate of controlled cross-section. Such a machine is unsuitable for conveying and discharging a non-formable material such as a granular material. However, an extruder can be operated to convey and discharge a non-formable granular solid, by simply removing the flow-restrictive orifice or die at the extruder exit.

Machines with rotors and paddles especially designed for blending and conveying granular materials are known in the art. These machines in general are not equipped with screws capable of generating significant thrust and are thus not suitable for processing molten thermoplastics. See *Mixing,* Vol II, by V. Uhl and J. Gray, p. 280, Academic Press, New York, 1966.

Machines for melting, mixing, devolatilizing, and pressurizing polymers and other substances equipped with a multiplicity of rotors are preferred for mixing. Typical such machines are screw extruders, multiple-screw or twin-screw extruders being preferred over single-screw extruders for conveying materials while they are being mixed. Fully meshed, co-wiped co-rotating screws are generally preferred for mixing operations.

In a usual continuous process, the residence time of materials in an extruder is very short. It, therefore, often is difficult to achieve thorough mixing in one pass. Further, if the feed throat of an extruder is open to the atmosphere, it is difficult to achieve or maintain a pressurized condition in an extruder when processing granular solids, although this can be more readily accomplished when processing molten plastics.

In conventional multiple-rotor batch mixers, the materials to be processed are introduced into a chamber typically containing two rotatable mixing tools. Mixing can be continued for any desired period; that is, the residence time is in principle unlimited. At the conclusion of mixing, the chamber is opened, and the material is removed from the mixing chamber, typically by means of a combination of gravity and scraping or by using a discharge screw. A batch mixer can be operated at any desired gas pressure, including gas pressures that are in general much higher than those obtainable in an extruder.

Extruders thus have the advantage of rapid and continuous processing, along with ease of material handling, while batch mixers have the advantage of unlimited mixing times and higher gas pressures.

Scheuring, U.S. Pat. No. 5,332,308, combines a batch mixer with an extruder into a single integrated apparatus consisting of a batch mixer situated above one end of a twin-screw extruder the direction of rotation of the screw of which is reversible. In operation, the screws initially rotate so as to convey ingredients toward and retain them in the batch mixing unit until the desired degree of mixing has been achieved, at which point the direction of rotation of the screws is reversed and the material is conveyed to the exit die of the extruder and thence extruded.

Osrow, U.S. Pat. No. 4,391,575, discloses a kitchen device for making dough-like products that combines a single-screw extruder with a mixer into a single, integrated device. The screw rotates to convey material to the batch mixer during mixing; the direction of screw rotation is reversed at the conclusion of mixing in order to discharge the material.

Inoue, Japanese Patent Application SHO 63(1988)-32472, discloses a combination of an extruder and feed system which operates by metering into the extruder screw a predetermined quantity of material to be mixed as the screw turns in the forward direction. After the predetermined amount is admitted, the feeder is closed, and the direction of the screw is reversed. The screw direction is then cycled forward and reverse at predetermined intervals to achieve mixing. Finally, the screw is rotated in the forward direction to extrude the mixed ingredients through a breaker plate into a cavity for further processing.

Inoue's device does not address operations under pressure. Further, the employment of a breaker plate at the exit of the extruder does not permit processing granular solids. Finally, the open extruder barrel is undesirable for processing molten materials because of the potential for leakage.

SUMMARY OF THE INVENTION

The present invention provides a mixing apparatus suitable for use with both solid and molten polymeric resins, said apparatus comprising:

(a) an extruder barrel, which can be heated and cooled;

(b) a closeable port for charging materials to be processed into said extruder barrel;

(c) at least two meshed, co-rotatable, self-wiping extruder screws located within the bore of the barrel;

(d) a drive means for the screws capable of reversing the direction of rotation of the screws, (e) a laterally flexible coupling connecting the drive means to the screws and capable of sustaining both thrust and tension; and (f) a means for effecting the change of direction of rotation of the screws in response to the occurrence of a predetermined event;

the end of the barrel (a) proximate to the drive means (d) being sealed closed, and the opposite end of the barrel (a)

being provided with a means for closing the barrel during mixing and opening it for discharging the material being processed therein.

Preferably, this apparatus further comprises a means for determining the occurrence of the predetermined event requiring changing the direction of rotation of the screws.

The mixing apparatus of this invention is suitable for mixing and conveying polymeric substances in either molten or solid particulate form, or some combination of the two. Further the mixing apparatus of this invention provides for mixing in a controlled atmosphere.

This invention further provides a novel, laterally flexible coupling means connecting the drive means to the screw shafts of the mixing apparatus, the coupling means being capable of sustaining both applied thrust and applied tension.

Finally, this invention provides a new process for mixing polymeric or polymerizable substances and a process for making a high molecular weight polyamide.

DETAILED DESCRIPTION OF THE INVENTION

In a preferred embodiment of the present invention, the apparatus is a modified twin screw extruder. This modified extruder is equipped with a means for opening and closing the discharge end of the barrel, a reversible-direction drive means, and a laterally flexible coupling means connecting the screws to the drive means to permit application of both thrust and tension to the screws in order to convey material in either forward or reverse direction during mixing. Commercial extruders are available with closeable feed ports as well as with additional ports that may be desired for venting or for the application of pressure or vacuum.

A means for closing the discharge opening of the extruder barrel may be, for example, a male threaded plug that fits into the female-threaded discharge opening; a flat, hinged and gasketed end plate secured to the face of the extruder and covering the barrel opening; a plate inserted into the extruder between the tips of the screws and the discharge opening; and a tapered plug inserted into a suitably tapered discharge opening, with a means for inserting and removing the plug. Each one of those closing means can be made gas-tight by using gaskets, seals, coatings, and similar techniques well known to those skilled in the art. For simplicity and ease of use, a flat end plate is very satisfactory.

Extruders usually are provided with a coupling means between the drive means and the screws to allow decoupling for maintenance or repair and, in the case of flexible couplings, to compensate for any misalignment between the drive and the screw shafts such as may occur when there are significant differences in temperature between the drive means and the screws. The coupling means typically is designed to apply rotation and forward thrust to the screw. A well known commercially available coupling means is a so-called Oldham coupling.

A flexible coupling mechanism suitable for the mixing apparatus of this invention must be able to sustain both applied thrust and applied tension.

Figure 1:
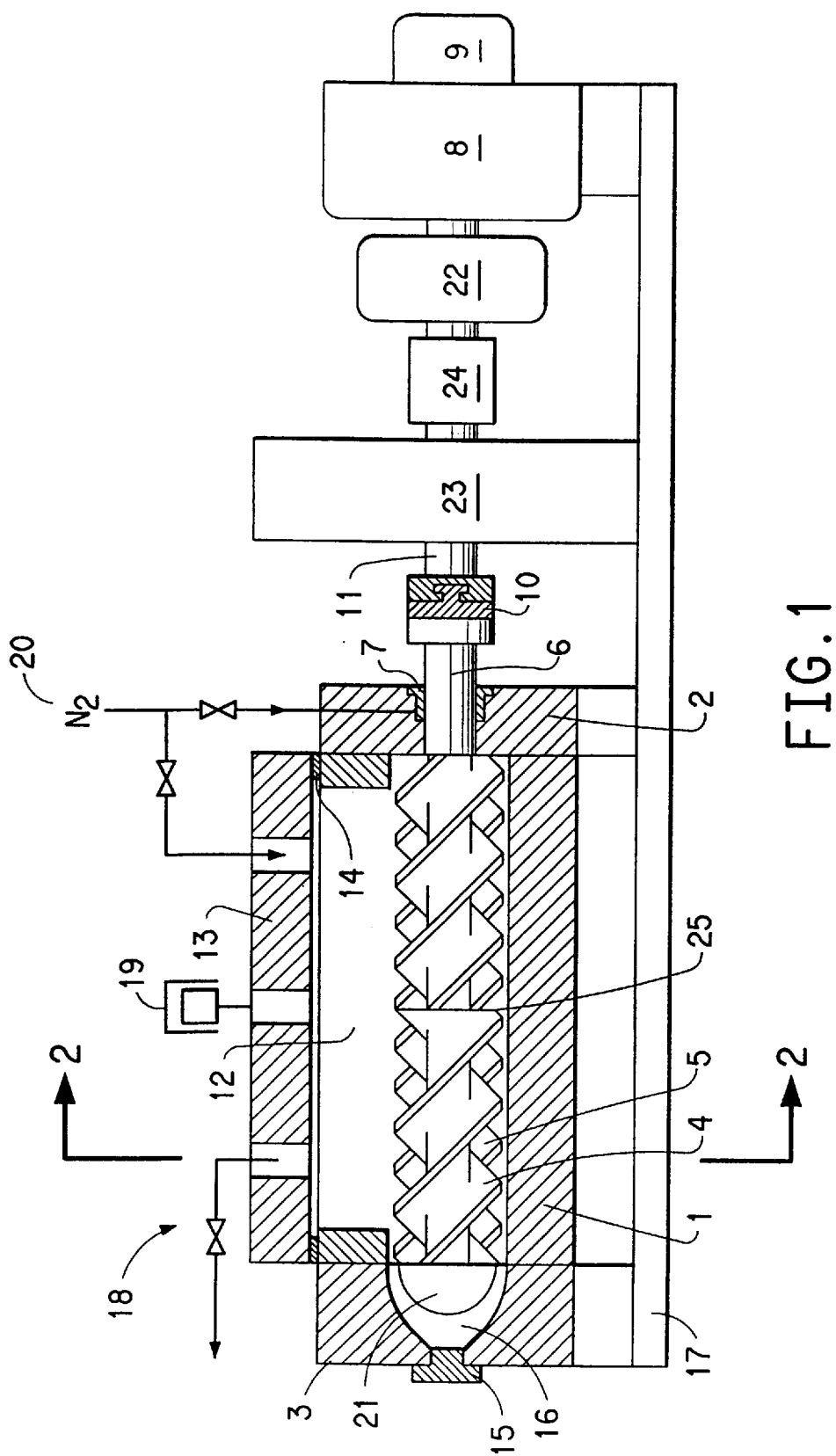
FIG. 1 shows a partial longitudinal cross-section and side view of a preferred embodiment of the apparatus of this invention.

A preferred apparatus of the present invention is shown in FIG. 1, which shows a twin-screw extruder, where 1 is the extruder barrel closed in the rear with end plate 2 and in front with end plate 3. The drawing shows two two-flighted screws, 4 and 5. One screw shaft, 6, is shown; it is sealed with seal 7. The seals are made of standard packing material but can also be connected to a source of pressurized nitrogen or other inert gas to decrease the chances of leakage of any gaseous materials through the seals to the outside or of air entering when operating at a reduced pressure. The screws 4 and 5 are connected to a variable speed reversible rotation drive gear motor, 8, equipped with a motor controller 9. The connection of each screw to the drive mechanism is made through a specially modified Oldham coupling 10 and drive shaft 11. In this particular embodiment, material to be processed is charged into the extruder cavity 12 by removing top plate 13 and then replacing and fastening it to the barrel by means of bolts, not shown. The plate rests on an aluminum gasket, 14. The processed material is removed from the extruder cavity 12 by unscrewing threaded plug 15 and operating the screws in the forward direction, so as to pump the material out through passage 16. The apparatus rests on base 17. Various other accessories shown in this figure include vacuum or vent line 18, rupture disk assembly 19, external pressurized gas delivery manifold 20, screw caps 21, torque transducer and readout 22, gear box speed reducer 23, and overload protection coupling 24.

Because the direction of rotation of screws 4 and 5 is reversible, the material being processed can be conveyed in turn forward and backward from one end of the extruder barrel to the other for as long a period as necessary, depending on the requirements of each particular application in which this apparatus is used.

Motor 8 is controlled to reverse its direction at any desired stage of mixing. This can be done, for example, by changing the direction at predetermined time intervals, by installing a pressure transducer at each end of the barrel to indicate when the material being conveyed along the screws 4 and 5 has reached either end of the barrel, or by presetting the torque level, which can be measured with a torque indicator connected to the drive shaft. Preferably, but not necessarily, the occurrence of the event which triggers the change of direction of the screws will be detected automatically and will automatically cause the drive means to reverse its direction. In rare cases, such as, for example, when the apparatus is used to produce or to mix experimental materials, it may be practical to change the direction of rotation of the screws manually, at the discretion of the operator.

The screws of the mixing apparatus of this invention preferably are two-flighted or three-flighted. Either type of screws is available with commercial extruders. In order to enhance mixing and communication between material-containing channels, each screw is provided with at least one discontinuity in the flights thereof along the length of the screw, where adjacent flights of the same screw are twisted with respect to each other so as to create, in the case of a two-flighted screw, an angular offset of 90° with respect to each other. This discontinuity of the flights can be conveniently located in the middle of the length of the screw. In FIG. 1 this discontinuity is shown as 25. In the case of three-flighted screws, the offset normally would be 60°.

Figure 2:
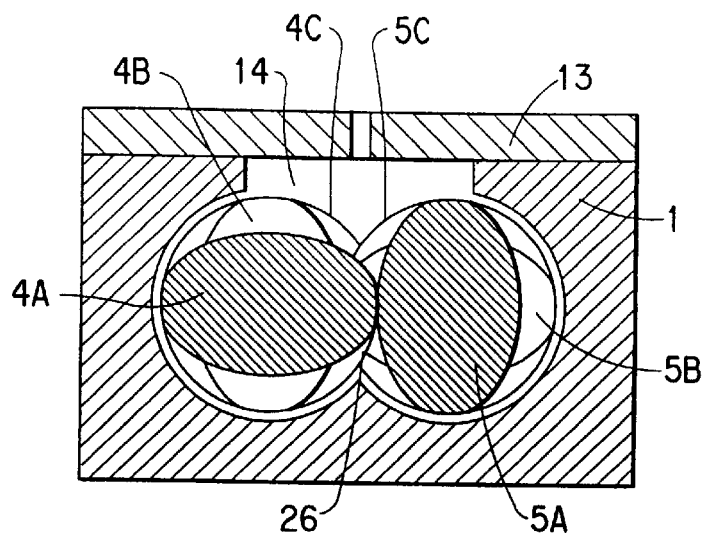
FIG. 2 shows a partial lateral cross-section and front view of the apparatus shown in FIG. 1.

FIG. 2 presents a partial transverse cross-section through plane 2—2 of the twin-screw extruder shown in FIG. 1 having fully meshed, co-wiped two-tipped screws. The same parts have the same numbers as in FIG. 1. In FIG. 2, each one of screws 4 and 5 is shown as front and rear sections of a flight of each screw, 4A and 4B and 5A and 5B, respectively, those sections of each flight being offset at 90° to each other, while 4C and 5C represent the front views of the peripheries of the flights of the screws. FIG. 2 also shows a 90° offset between the flights of the neighboring screws 4 and 5 with respect to each other. Screws 4 and 5 mesh within region 26.

Given screws of the same diameter operating at the same speed, three-flighted screws will impart a higher shear rate to the material being processed, which may be necessary in some instances. Two-flighted screws, on the other hand, have greater free volume and can hold a greater amount of material.

Figure 3:
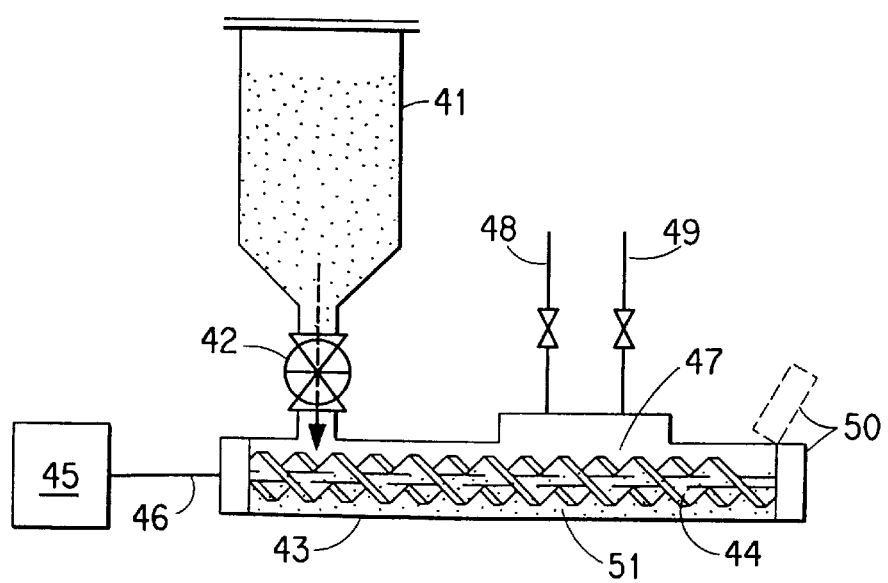
FIG. 3 shows schematically an embodiment of the apparatus of the present invention equipped with a feed hopper for charging material to be processed and with a closing plate for discharging the processed material.

Another preferred embodiment of the mixing apparatus of the present invention is shown schematically in FIG. 3. In this embodiment, material is charged from feed hopper 41 into the barrel 43. The hopper is equipped with valve 42 that can be opened or closed as desired, either by manual control or by an automatic control. The mixing apparatus, although not shown in detail, has similar design as that depicted in more detail in FIG. 1, comprising barrel 43 and a pair of fully meshed co-wiping co-rotating screws, of which one, 44, is shown. Instead of the male threaded plug 15, shown in FIG. 1, the barrel of FIG. 3 can be closed at its exit end with hinged plate 50, shown in closed position in solid lines and in open position in broken lines.

FIG. 3 further shows the reversible drive means 45 and connecting shaft 46, the barrel cavity, 47, and two process ports, 48 and 49, which permit connection to a vacuum system, pressurized gas, or other fluid lines as may be desired. Barrel 43 is shown as being less than completely filled with material 51, which is the preferred mode of operation. Upon conclusion of operation, hinged plate 50 is opened, and the material is discharged through the opening.

Figure 4A:
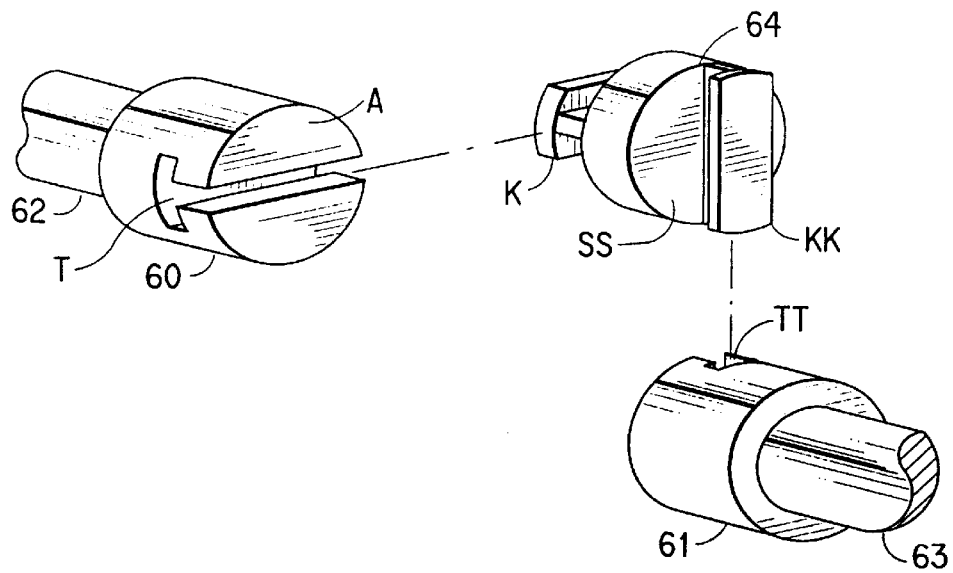
FIGS. 4A, 4B, and 4C show the perspective view, the top view and the side view, respectively, of a flexible coupling device of this invention capable of sustaining both applied thrust and applied tension.
Figure 4B:
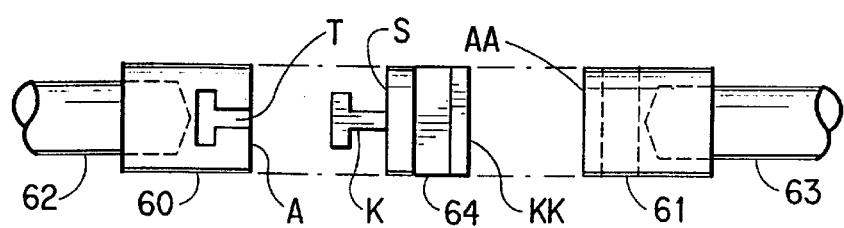
Figure 4C:
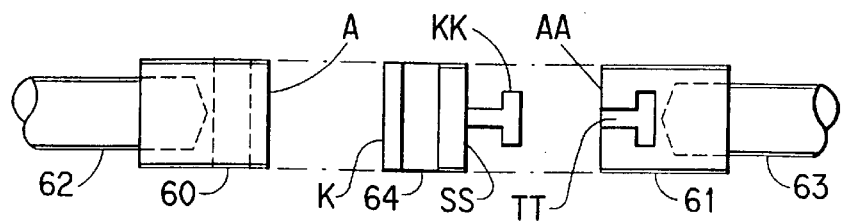

Reverting now to FIG. 1, a particularly desirable flexible coupling means 10 is used to connect the reversible drive means 8 to the shafts (such as 6) of screws 4 and 5. This coupling means, shown in greater detail in FIG. 4, is a modified Oldham coupling, otherwise known in the art; see, for example, *Design of Machine Elements*, page 127 Faires, Macmillan Co., New York, 1948. Oldham couplings, while providing a desirable degree of lateral flexibility, are not capable of sustaining applied tension. The modified Oldham coupling of this invention, shown in FIGS. 4A, 4B, and 4C, can sustain both tension and thrust. FIG. 4A is a perspective view; FIG. 4B is a top view; and FIG. 4C is a side view of this coupling. It comprises two coupling members, 60 and 61, each affixed to the end of a rotatable respective shaft, 62 and 63, to be coupled, and a central member, 64. Each directly opposed flat surface, A and AA, of each coupling member 60 and 61 comprises an inverted T-shaped groove, T and TT, cut in it. Each of the two opposite sides of member 64 is a flat surface, S and SS, respectively, with a raised T-shaped cross-section key, K and KK, adapted to fit into grooves T and TT, respectively, of coupling members 60 and 61, wherein it can slide in either direction along each groove. The two keys are offset at a right angle to each other.

Figure 5A:
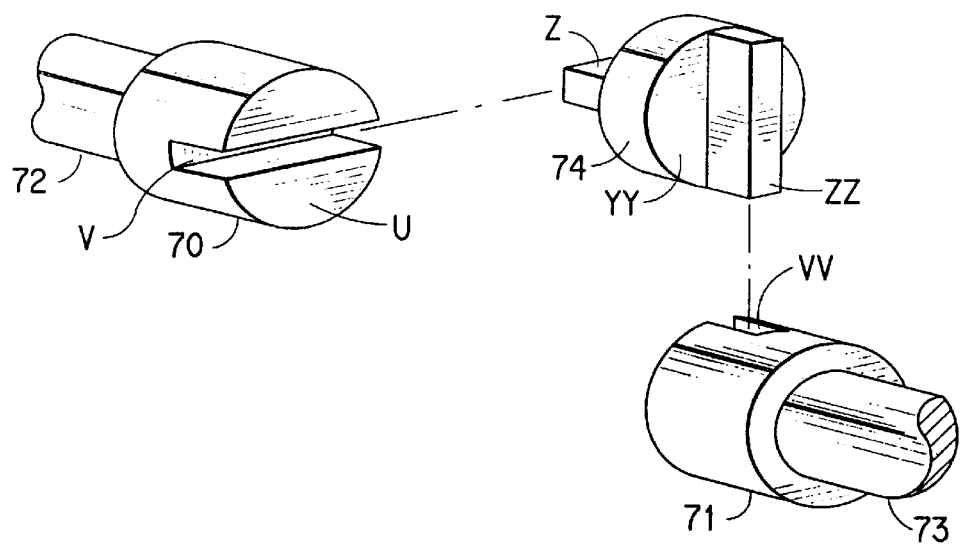
FIGS. 5A, 5B, and 5C represent the perspective view, the top view and the side view, respectively, of a prior art Oldham coupling device.
Figure 5B:
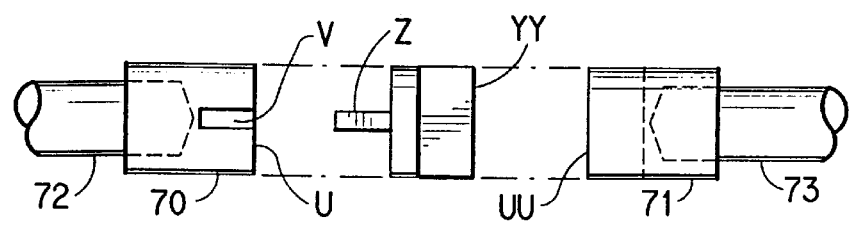
Figure 5C:
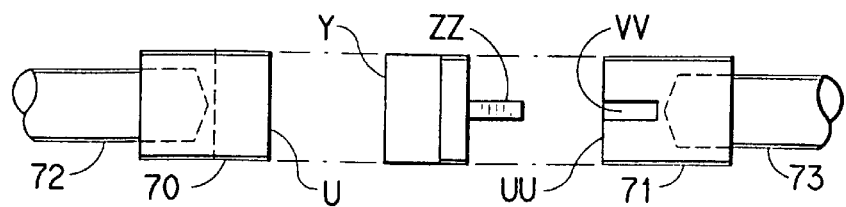

The conventional Oldham coupling, shown in FIGS. 5A, 5B, and 5C, which are, respectively, a perspective view, a top view, and a side view. This coupling likewise has two coupling members, 70 and 71, affixed to the ends of rotatable shafts 72 ands 73. Their directly opposed surfaces U and UU have rectangular grooves V and VV cut in them. Central member 74 has flat surfaces Y and YY with raised rectangular keys Z and ZZ adapted to fit into the corresponding grooves V and VV of members 70 and 71.

The improved Oldham coupling of the present invention can sustain thrust from the screw in one direction of rotation, and tension from the screw in the opposite direction of rotation.

The material being processed is conveyed toward one or the other end of the extruder barrel, and on the occurrence of a predetermined event, the direction of screw rotation is reversed in order to convey the material toward the other end of the extruder barrel. The time required to transport the material from one end of the barrel to the other will depend on the screw speed and on its design. These factors also determine the shear forces to which the material is subjected during processing. It is preferred that the material to be processed be maintained within the screw flights at all times and be compacted at either end of the extruder barrel for at least a few seconds but preferably less than one minute, during which it is intensely mixed, but not permitted to overheat. If the change is based on elapsed time, it may be conveniently set for any desired interval, such as a few seconds to several minutes, or even hours, although such long intervals would not be useful in practice. Preferably, the direction of rotation of the screws is changed at intervals of not more than 10 minutes, especially at most one minute, and even more preferably at most thirty seconds.

Various methods of reversing the direction of rotation of a motor are known, and none is considered critical for this invention. The drive need not be an electric motor; it can be any prime mover which transmits power via a rotating shaft.

The ratio of the length to the outer diameter (L/D) of the screws suitable for the practice of this invention is in the range of about 4:1 to 80:1.

During operation, the atmosphere may be adjusted, with application of gas, or vacuum, or both. If the mixing apparatus of this invention is to be operated under a high gas pressure or at a reduced pressure, it may be advantageous to apply external gas pressure to the mixer's shaft seals, to inhibit leakage of the gas out of the extruder. The screw speed, and thus the applied shear rate and the barrel temperature can be adjusted.

The mixing apparatus of this invention is well-suited to mixing and conveying of particulate solids, particularly frangible particulate solids which tend to form agglomerates that must be continually comminuted. When a frangible solid is processed, it is preferred that the discharge opening of the barrel be fitted with a hinged flat plate across the face of the barrel, as shown in FIG. 3; and when the plate is removed, that the material be discharged, without any flow-restricting elements such as extrusion dies being placed in its path.

This apparatus is well-suited to combining one or more polymeric or polymerizable substances with at least one other substance such as inorganic fillers, fibers, other polymeric or polymerizable substances, plasticizers, antioxidants, processing aids, and UV stabilizers.

This apparatus is particularly suitable for the production of polymers such as polyesters and polyamides under conditions such that the material in the mixing apparatus is present as a solid phase during a substantial portion of the polymerization process.

The following example illustrates the use of a meshed, self-wiping, co-rotating twin-screw mixing apparatus of the present invention for the preparation of nylon 66 prepolymer from anhydrous salt. The apparatus was of the type illustrated in FIG. 1, wherein each screw was 165-mm long, and its outer diameter was 40 mm. The barrel was electrically heated and water-cooled. A timer was employed for actuating the reversal of the direction of the drive motor.

With cover plate 13 open, the mixer was purged with nitrogen for 5 minutes. The mixer was then charged with 40 g of anhydrous hexamethylene diammonium adipate having a water content of less than about 1% by weight. The mixer was sealed, and nitrogen at 250 psi (1720 kPa) was applied to the shaft seals. Nitrogen was introduced through the feed port to purge the mixer for one minute, then removed at vacuum. The purge/vacuum cycle was repeated five more times. The barrel temperature was set at 200° C. The screw speed was set at 24 revolutions per minute, and the screw reversal cycle was set at 5 seconds. These settings were maintained while the barrel was heating and then continued for one hour. The mixer was vented by opening the vent valve . . . very gradually. A gentle nitrogen purge was immediately begun; the screw drive was turned off, and the barrel was cooled with circulating water until it was cool enough to handle. The end plate was removed. The contents of the mixer in passage 16 was collected but not retained as the desired product. Because passage 16 is in effect a dead space, the material contained therein was not as thoroughly mixed as the material remaining in the barrel. The screws were restarted to pump out and collect the contents of the mixer. The material recovered in this operation was in a free-flowing particulate form. Analysis by Differential Scanning Calorimetry (DSC), ASTM D3418, revealed that the product had melting characteristics which were very similar to a commercially available nylon 66 sample (ZYTEL® 101—DuPont Company) indicating conversion to polymer a unreacted nylon 66 salt.

The material contained no unconverted hexamethylene diammonium salt and was a polymeric material. While the experiment was not carried beyond this first stage, a commercial process would usually be continued in a second, vented, stage heating and mixing the product of this step with the vent open, with or without sweeping of the extruder with a stream of nitrogen to remove any additional water that may be formed as the molecular weight of the polymer further increases. This can be done at any suitable temperature, preferably below the melting point of the desired final high molecular weight polaymide, and especially under conditions such that the polymer remains during this second, vented, stage in a substantially solid state. In this way, thermal degradation of the high molecular weight polyamide is minimized.

The complete polyamide preparation process can thus be carried out in two stages in the same apparatus, without a need for material transfer. In the first stage, the starting material, such as an anhydrous polyamide salt (nylon salt) is heated with good mixing at a temperature at which it melts but below the temperature at which the polymeric product of the first stage melts. In the second stage, the mixer is vented, and mixing and heating are continued until the desired high molecular weight polyamide is formed. This process is quite rapid and produces a homogeneous material having a commercially attractive narrow molecular weight distribution.

We claim:

1. A process for making a high molecular weight polyamide, said process comprising (A) charging a diamine salt of a dicarboxylic acid, said salt containing at most about 1 weight percent of water, into the barrel of a mixing apparatus comprising:

(a) an extruder barrel, which can be heated and cooled;

(b) a closeable port for charging materials to be processed into said extruder barrel;

(c) at least two meshed, co-rotatable, self-wiping extruder screws located within the bore of the barrel;

(d) a drive means for the screws that is capable of reversing the direction of rotation of the screws, (e) a laterally flexible coupling connecting the drive means to the screws and capable of sustaining both thrust and tension;

(f) a means for determining the occurrence of a predetermined event requiring changing the direction of rotation of the screws; and (g) a means for effecting the change of direction of rotation of the screws in response to the occurrence of said predetermined event;

the end of the barrel (a) proximate to the drive means (d) being sealed closed, and the opposite end of the barrel (a) being provided with a means for closing the barrel during mixing and opening it for discharging the material being processed therein;

(B) in a first stage, maintaining in the barrel of the apparatus a temperature sufficient to initially cause the charge to melt but lower than the melting temperature of the product of the first stage, causing the screws to rotate repeatedly in a first direction and then in the opposite direction according to a predetermined cycling pattern, so as to mix and repeatedly convey the charge toward each end of the barrel until a solid polymeric material having lower molecular weight than the desired final polyamide has been formed;

(C) in a second stage, venting the mixing apparatus and continuing to mix the charge, with or without passing a stream of an inert gas through the barrel of the apparatus, while maintaining a temperature within the barrel below the melting temperature of the desired high molecular weight polyamide product;

(D) opening the discharge end of the barrel and causing the screws to rotate in the direction required to expel the charge from the barrel; and (E) collecting the so-expelled polyamide product.

2. The process of claim 1 wherein the charge is hexamethylene diammonium adipate, and the product of the second stage is nylon 6,6 having a higher molecular weight than the product of the first stage.

* * * * *